(12) United States Patent
Kawano et al.

(10) Patent No.: US 7,779,722 B2
(45) Date of Patent: Aug. 24, 2010

(54) PARKING BRAKE

(75) Inventors: Eiji Kawano, Wako (JP); Naoto Shibui, Wako (JP); Fumikage Yamanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 11/608,019

(22) Filed: Dec. 7, 2006

(65) Prior Publication Data

US 2007/0151396 A1     Jul. 5, 2007

(30) Foreign Application Priority Data

Dec. 16, 2005    (JP)   .............................. 2005-362884

(51) Int. Cl.
*B60T 7/02* (2006.01)
*B60T 7/10* (2006.01)
(52) U.S. Cl. .......................... 74/523; 74/501.6; 74/519; 74/543
(58) Field of Classification Search .................... 74/523, 74/525, 500.5, 501.5 R, 501.6, 519, 512, 74/529, 532, 535–540, 560
See application file for complete search history.

(56) References Cited

U.S. PATENT DOCUMENTS

| 4,149,433 | A * | 4/1979 | Schroter ........................ 74/516 |
| 4,212,211 | A * | 7/1980 | Rickert ......................... 74/538 |
| 6,286,389 | B1 * | 9/2001 | Papadatos ..................... 74/535 |
| 6,382,048 | B1 * | 5/2002 | Youn et al. .................... 74/529 |
| 6,817,264 | B2 * | 11/2004 | Hiura et al. ................... 74/512 |
| 2003/0132070 | A1 * | 7/2003 | Gross et al. ................. 188/265 |

FOREIGN PATENT DOCUMENTS

| JP | 63-8151 | 1/1988 |
| JP | 7-31537 | 6/1995 |
| JP | 10-287219 | 10/1998 |
| JP | 2007062579 | 3/2007 |

* cited by examiner

*Primary Examiner*—Richard W Ridley
*Assistant Examiner*—Thomas Diaz
(74) *Attorney, Agent, or Firm*—Rankin, Hill & Clark LLP (57) ABSTRACT

A lever 2 includes first and second lever members 10, 20 between which both sides of a base B are interposed. A guide piece 14, which is a part of first lever member 10 arranged on first side of the base B, is formed being located on a second side of the base B. The guide piece 14, which is a part of the first lever member 10 located on the second side, has a guide portion to guide a wire 4 together with a guide piece 24 formed in the second lever member 20.

9 Claims, 6 Drawing Sheets

PARKING BRAKE

BACKGROUND OF THE INVENTION

1. Field of the Invention

The present invention relates to a parking brake in which a guide portion to guide a wire is provided in a manual operation lever.

2. Description of Related Art

Figure 6:
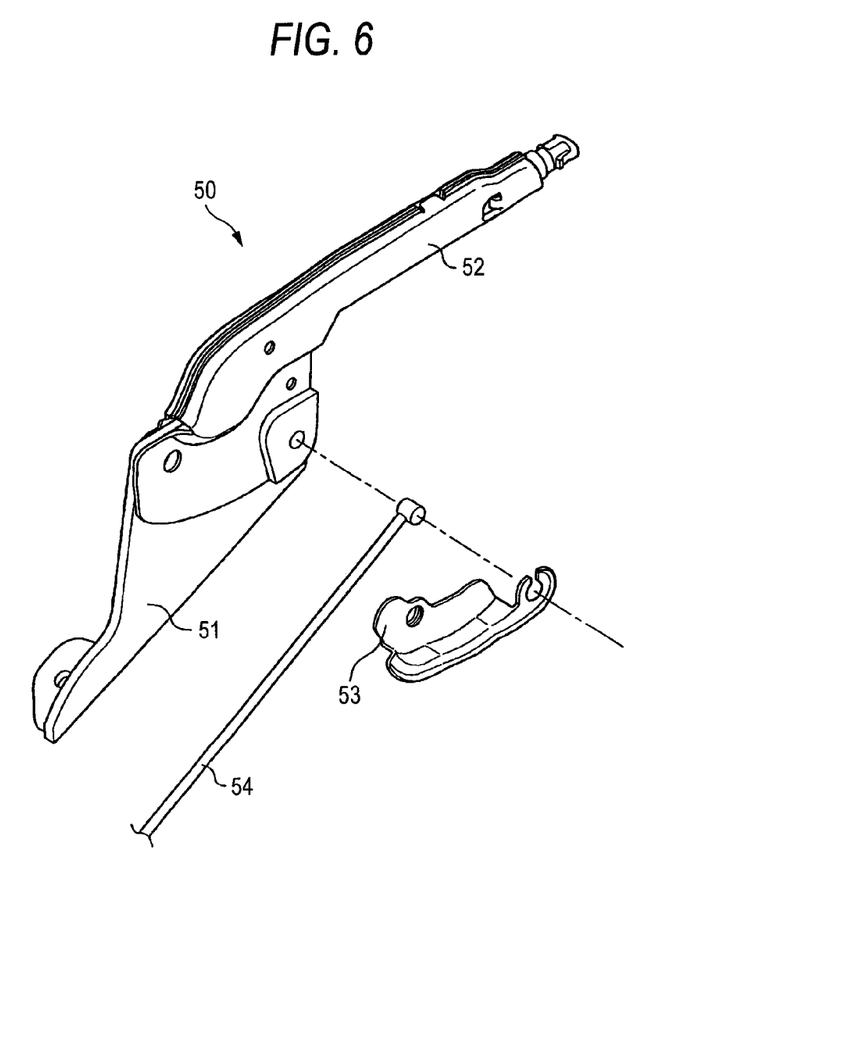
FIG. 6 is an exploded perspective view showing a conventional parking brake.

A parking brake is composed and operated as follows. The parking brake is arranged, for example, on the side of a driver's seat in a vehicle. When a driver manually operates a parking brake lever at the time of parking, a wire to connect the parking brake lever with a brake device is pulled. Thus, the brake device is operated and a brake force is generated in the vehicle. For example, Japanese Patent Unexamined Publication JP-A-10-287219 discloses a parking brake having a guide portion to guide a wire. Further, a parking brake 50 is proposed as shown in FIG. 6 in which a guide member 53 is fixed to a lever 52 attached to a base 51, and a forward end portion of a wire 54 is supported by the guide member 53 and the lever 52.

However, in the conventional parking brake described above, the following problems are caused. Since a guide portion to guide a wire is composed of a different member, and when a lever is operated, the guide member is given a heavy load, it is necessary for the guide portion to be strongly joined onto the lever side by means of welding or others. However, when the guide portion is fixed by the means described above, problems may be encountered from the viewpoint of mechanical strength. Further, a step of welding is needed in the manufacturing process. Therefore, the assembling step becomes complicated.

SUMMARY OF THE INVENTION

The present invention has been accomplished to solve the above problems of the related. An object of the present invention is to provide a parking brake in which the problem caused in the mechanical strength can be solved and the assembling step can be simplified.

According to a first aspect of the invention, there is provided a parking brake comprising:
a base comprising a first side and a second side;
a lever oscillatably supported on the base so as to sandwich the base therein, comprising:
a first lever member arranged on the first side of the base; and
a second lever member arranged on the second side of the base; and
a guide member that guides a wire to generated brake force in accordance with an operation of the lever,
wherein
a part of the first lever member is located on the second side of the base, and
the part of the first lever member located on the second side of the base and a part of the second lever member form the guide member.

According to the present invention, the guide portion guiding the wire and the lever member can be integrated with each other into one body. Therefore, the number of parts can be reduced and the mechanical strength of the guide portion can be enhanced.

According to a second aspect of the invention, as set forth in the first aspect of the invention, it is preferable that the parking brake according to claim 1, wherein the part of the first lever member located on the second side of the base is integral with a front and a rear portion of the first lever member located on the first side of the base, and
the front and rear is defined relative to the base.

Due to the foregoing, the base is inserted into an insertion hole formed between the portion on a first side of first lever member and a portion located on the second side of the first lever member. Therefore, the guide portion can be continuously formed to be long. Since the guide portion is integrally formed into one body in the front and rear of the base, as compared with a case in which the guide portion is integrally formed into one body only in the front or the rear of the base, the mechanical strength of the guide portion can be enhanced.

According to the present invention, it is possible to provide a parking brake characterized in that problems caused from the viewpoint of mechanical strength can be solved and further the assembling step can be simplified.

According to a third aspect of the invention, as set forth in the second aspect of the invention, it is preferable that a part of the second lever member comprises:
an upper guide piece perpendicularly bent to an opposite direction of the base; and
a side guide piece perpendicularly bent downward with respect to the upper guide piece, and
a connecting hole, to which the wire is connected, are provided in the part of the first lever member and the side guide piece.

According to a fourth aspect of the invention, as set forth in the first aspect of the invention, it is preferable that the parking brake further comprising:
a ratchet gear on the base; and
a pole that is oscillatably supported on one of the first and second lever members,
wherein the pole engages with the ratchet gear to hold the lever in an operating state, and
the lever member is formed to cover the ratchet gear.

According to a fifth aspect of the invention, as set forth in the first aspect of the invention, it is preferable that the part of the first lever member comprises:
a guide portion that forms the guide member together with the part of the second lever member;
a slit opening in a front-rear direction through which the base is inserted; and
front and rear portions that is formed on front and rear position of the slit, and integrally connects the guide portion to a part of the first lever member located on the first side of the base.

DETAILED DESCRIPTION OF EXEMPLARY EMBODIMENTS OF THE INVENTION
EMBODIMENTS

Figure 1:
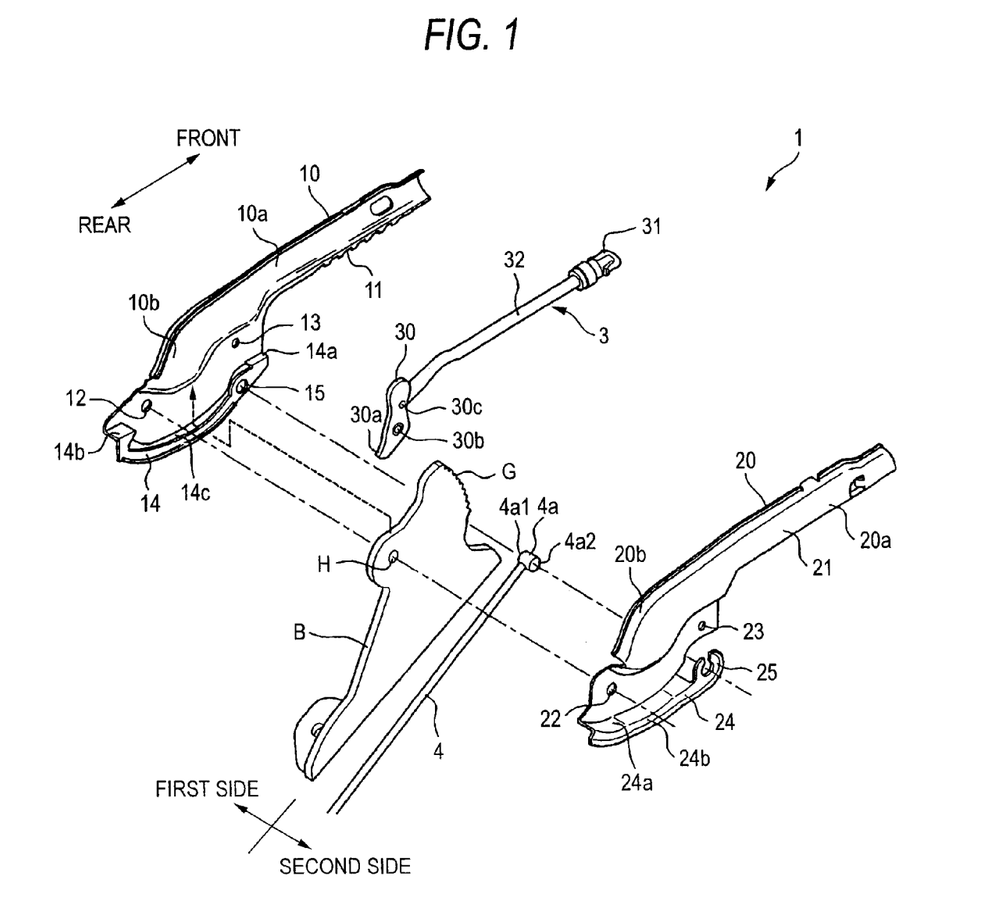
FIG. 1 is an exploded perspective view showing a parking brake of the present embodiment.
Figure 2:
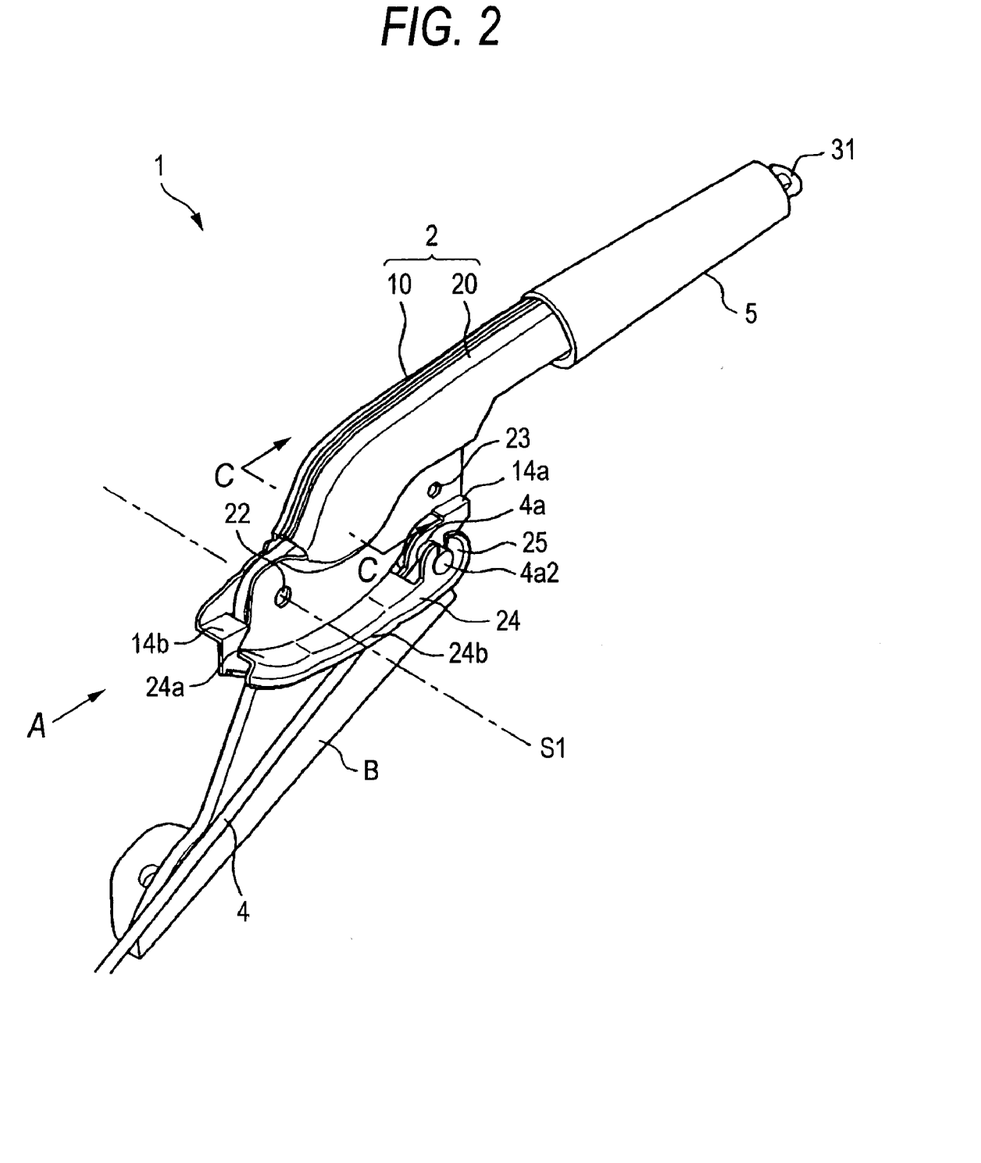
FIG. 2 is a perspective view showing a state in which the parking brake of the present embodiment has been assembled.
Figure 3:
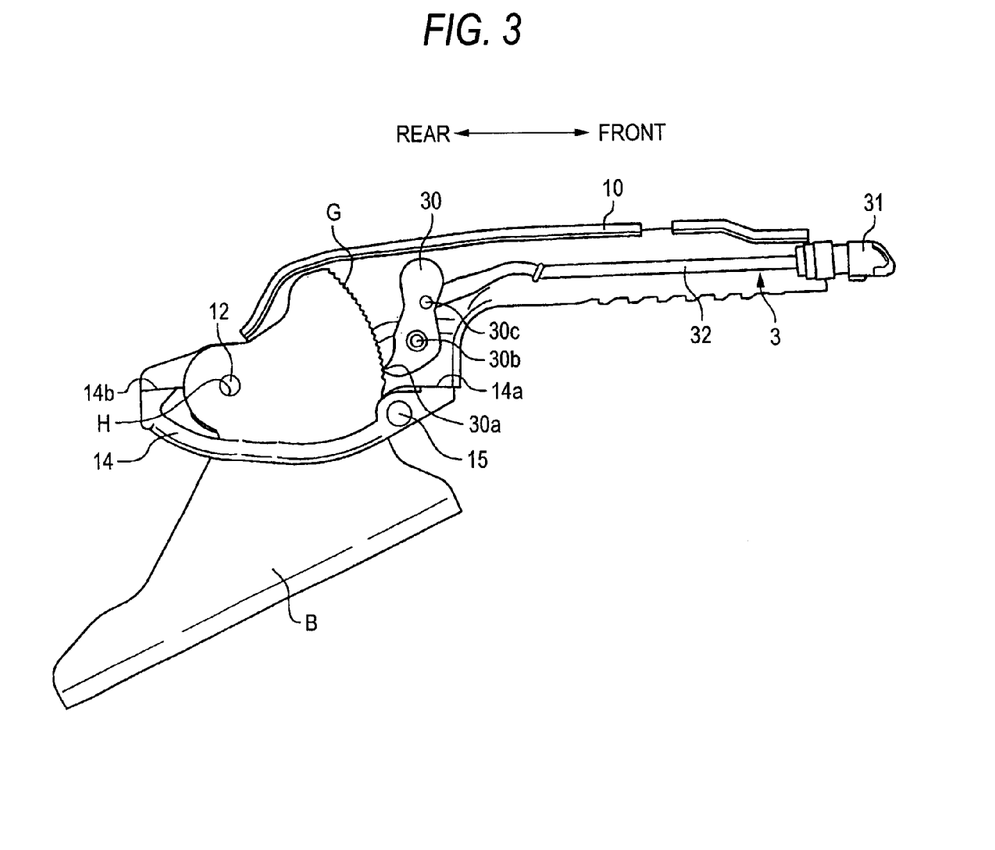
FIG. 3 is a plan view showing a lock mechanism portion assembled into one lever member.
Figure 4:
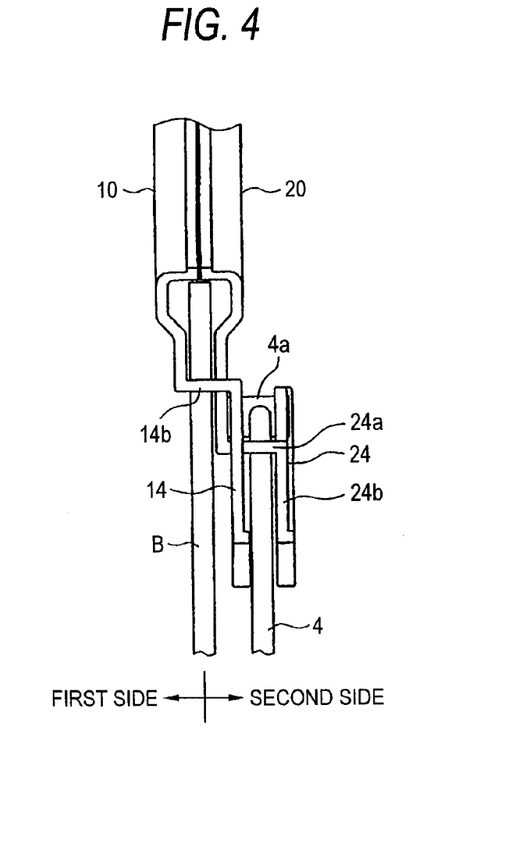
FIG. 4 is a view taken in the direction of arrow A in FIG. 2.
Figure 5:
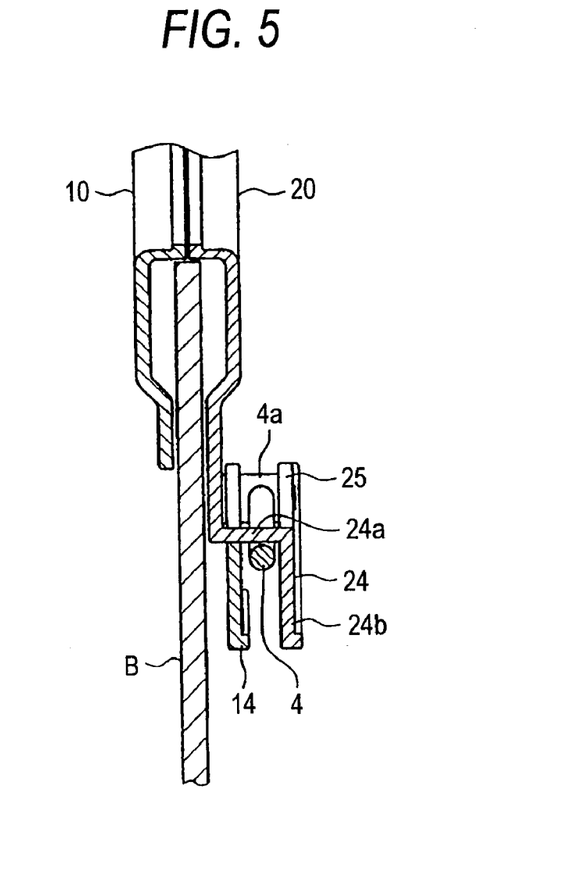
FIG. 5 is a sectional view taken on line C-C in FIG. 2.

FIG. 1 is an exploded perspective view showing a parking brake of the present embodiment, FIG. 2 is a perspective view showing a state in which the parking brake of the present embodiment has been assembled, FIG. 3 is a plan view showing a lock mechanism portion assembled into one lever member, FIG. 4 is a view taken in the direction of arrow A in FIG. 2, and FIG. 5 is a sectional view taken on line C-C in FIG. 2.

As shown in FIG. 1, the parking brake 1 of the present embodiment includes: a base B attached to a vehicle body (not shown); a lever 2 (shown in FIG. 2); a lock mechanism 3; and a wire 4.

The base B is a metallic plate made of iron. A shape of the base B is formed into a substantial triangle. On a circumferential face of the base B which faces frontward, a predetermined shaped ratchet gear G is formed. At the rear of this ratchet gear G, a circular rotary hole H, which penetrates the metallic plate from first side to the second side, is formed.

The lever 2 includes: a lever member (a first lever member) 10; a lever member (a second lever member) 20; and a grip 5 (shown in FIG. 5).

The first lever member 10 is attached to the base B from first side. At a forward end portion 10a of the first lever member 10, a rod-shaped grip attaching portion 11, to which the grip 5 (shown in FIG. 2) is attached, is provided. A base portion 10b of the first lever member 10 is formed into a shape to cover the ratchet gear G and the rotary hole H on first side of the base B. In the first lever member 10, a circular attaching hole 12, which is oscillating supported by the rotary hole H, is formed. In the front portion of the base portion 10b of the first lever member 10, a circular engaging hole 13 is formed.

In the base portion 10b of the first lever member 10, a guide piece 14, which corresponds to a part of the guide portion of the present embodiment, is integrally formed. This guide piece 14 is a plate-shaped member which is curved into a substantial arc shape in the longitudinal direction and provided with one face, which is directed to first side, and also provided with the other face which is directed to the second side. At the front and the rear end portion of the guide piece 14, the base portion 10b and the guide piece 14 are integrated with each other into one body via the bent portions 14a, 14b. Due to this structure, the guide piece 14 is located with an interval between the base portion 10b and the guide piece 14 on the second side. In the guide piece 14, a connecting hole 15 is formed on the front side penetrating the guide piece 14.

The second lever member 20 is attached to the base B from the second side. At the forward end portion 20a of the second lever member 20, a grip attaching portion 21, which is formed symmetrically with the grip attaching portion 11 described before, is provided. The base portion 20b of the second lever member 20 is formed into a shape to cover the ratchet gear G and the rotary hole H formed on the second side. In the second lever member 20, an attaching hole 22, which is oscillatably supported by the rotary hole H, is formed. In the front portion of the base portion 20b of the second lever member 20, a circular engaging hole 23 is formed on the front side.

In the base portion 20b of the second lever member 20, a guide piece 24, which corresponds to a remaining portion of the guide portion of the present embodiment, is integrally formed. A cross-section of this guide piece 24 is formed into an L-shape (shown in FIG. 5), and this guide piece 24 is formed being curved into a substantial arc-shape in the longitudinal direction. In detail, this guide piece 24 includes: an upper guide piece 24a which is bent perpendicularly to the base portion 20b toward the second side; and a side guide piece 24b which is bent downward perpendicular to this upper guide piece 24. At the front end portion of the side guide piece 24b, a C-shaped connecting hole 25, which is formed by cutting out a portion of the hole, is formed. In this connection, this connecting hole 25 is formed being on the same axis as that of the connecting hole 15.

The lock mechanism portion 3 includes: a lock piece 30; a lock release button 31; and a rod 32.

The lock piece 30 includes: a release pawl 30a meshed with the ratchet gear G; a rotary support hole 30b which is a fulcrum of the rotation of the lock piece 30; and a rod connecting portion 30c. In this connection, the rod connecting portion 30c is formed at a position on the opposite side to the release pawl 30a with respect to the rotary support hole 30b.

The lock release button 31 is formed so that a forward end portion of the lock release button 31 can be protruded from a forward end portion of the grip 5 attached to the grip attaching portion 11, 21 (shown in FIG. 2).

The rod 32 is a long and slender rod-shaped member. One end portion of the rod 32 is pivotally connected to the rod connecting portion 30c of the lock piece 30, and the other end portion is connected to the lock release button 31. Therefore, the rod 32 is slid in the longitudinal direction being linked with a pushing motion of the lock release button 31. In this connection, although not shown in the drawing, inside the lock release button 31, a compression spring (not shown) is provided which pushes the lock release button 31 in a direction in which the lock release button 31 is protruded from the grip 5.

The wire 4 connects the lever 2 with a brake device (not shown) incorporated into a vehicle (not shown). The wire 4 is made of a flexible cable. This brake is operated by a different system from the system of a foot brake of the vehicle. For example, this brake is operated by the lever 2 so that a drum type brake provided in the rear wheel can be applied. Concerning the wire 4, a columnar-shape connecting pin 4a is fixed to a forward end portion of the wire 4. The wire 4 is connected to the lever 2 via this connecting pin 4a.

As shown in FIG. 1, in the parking brake 1 of the present embodiment composed as described above, the base B is inserted into the insertion hole 14c, which is formed in the first lever member 10, from the lower side shown in the drawing so that the rotary hole H is concentric with the attaching hole 12. Then, the lock mechanism portion 3 is arranged in the first lever member 10 so that the rotary support hole 30b of the lock piece 30 is concentric with the engaging hole 13 of the first lever member 10. FIG. 3 shows a state in which each component is arranged as described above. At this time, the release pawl 30a is meshed with the lowermost pawl of the ratchet gear G.

As shown in FIG. 1, one protruding portion 4a1 of the connecting pin 4a of the wire 4, which is arranged on the second side with respect to the base B, is inserted into the connecting hole 15 of the guide piece 14. After that, the second lever member 20 is attached from the second side of the base B. At this time, positioning is conducted so that the attaching hole 22 is concentric with the rotary hole H and so that the engaging hole 23 is concentric with the rotary support hole 30b of the lock piece 30. Under the condition that the other protruding portion 4a2 of the connecting pin 4a is inserted into the connecting hole 25, the second lever member 20 is pushed to the base B, and the base B is interposed between the first lever member 10 and the second lever member 20. In this connection, the rotary hole H and the attaching holes 12, 22 are connected with each other by various well known means such as pin connection or protruding and recessing engagement. The rotary support hole 30b and the engaging holes 13, 23 are connected with each other by various well known means such as pin connection, screw connection or protruding and recessing engagement in the same manner as that described before. Under the condition that the base B is interposed between the first and second lever members 10 and 20, the grip 5 is attached to the grip attaching portions 11, 21 by means of press-fitting. FIG. 2 shows a state in which the grip 5 is attached to the grip attaching portions 11, 21 in this way.

In the parking brake 1 described above, when a driver holds the grip 5 with his hand at the time of parking and pulls up the lever 2, the lever 2 is rotated around the rotary shaft S1 (shown in FIG. 2) counterclockwise in a plan view when the view is taken from the second lever member 20 side, so that a brake force can be generated in a brake device (not shown). At this time, the release pawl 30a of the lock piece 30 is engaged with the ratchet gear G. While sound is being generated, an engaging position, at which the release pawl 30a and the ratchet gear G are engaged with each other, is moved upward from the position shown in FIG. 3. In this connection, at this time, the rod connecting portion 30c of the lock piece 30 is pushed forward by an elastic force generated by a compression spring (not shown) built in the lock release button 31. Therefore, the lock piece 30 is pushed clockwise around the rotary support hole 30b. Accordingly, there is no possibility that an engagement of the release pawl 30a with the ratchet gear G is released without leave.

When the lever 2 is pulled up, the wire 4 is guided by the guide portion (shown in FIGS. 4 and 5) structured by the guide pieces 14, 24. In this case, a shape of the guide portion structured by the guide pieces 14, 24 is determined in such a manner that when the lever 2 is continuously pulled up by a predetermined length, a length of the wire 4 to be pulled up is short at the time of the start of pulling and long at the time of the end of pulling. That is, a position of the rotary shaft of the lever 2 is biased from the attaching position of attaching the wire 4 to the lever 2. In addition to that, the shape of the guide portion 24 is formed being curved. Therefore, as described before, at the time of the start of pulling, the length of the wire to be pulled is short. At the time of the end of pulling, the length of the wire to be pulled is long.

In the case where the parking brake 1 is released, when a driver pushes the lock release button 31 backward while holding the grip 5, the rod connecting portion 30c of the lock piece 30 is rotated counterclockwise via the rod 32 while the lock piece 30 is repulsing an elastic restoring force of a compression spring (not shown), and an engagement of the release pawl 30a with the ratchet gear G is released. When the lever 2 is lowered downward so that its posture becomes horizontal while this release state is being maintained, a tensile force given by the wire 4 to the brake device (not shown) is reduced, so that the brake force can be released. When the driver releases the lock release button 31, the parking brake returns to the state shown in FIG. 3 by an elastic restoring force of the compression spring (not shown).

As explained above, in the parking brake 1 of the present embodiment, as shown in FIGS. 2 and 4, a shape of the first lever member 10 is formed in such a manner that a part of the first lever member 10 is arranged from first side to the second side. A guide portion is structured by the part (the guide piece 14) of the first lever member 10, which is arranged on the second side, and also structured by a part (the guide piece 24) of the second lever member 20. Therefore, being different from the conventional example shown in FIG. 6, it is unnecessary that the lever member 52 and the guide member 53 are respectively made of different members. Accordingly, the number of components can be reduced. When the guide portion and the lever portion are formed being integrated with each other, it is unnecessary to conduct welding. Therefore, it becomes possible to enhance the mechanical strength of the guide portion, and problems caused from the viewpoint of the mechanical strength can be solved. Since the number of components is reduced, the manufacturing process can be simplified.

According to the parking brake device 1 of the present embodiment, the lever members 10, 20 can be respectively structured by one metallic plate by means of press forming. Therefore, the manufacturing cost can be reduced.

According to the parking brake 1 of the present embodiment, the guide piece 14 is formed being integrated into one body at two positions in the front and rear of the base B with respect to the base portion 10b of the first lever member 10. Into the insertion hole 14c formed as described above, the base B is inserted. Therefore, the guide portion can be continuously formed to be long. Further, the guide piece 14 is integrally formed at two portions in the front and rear of the base B. Therefore, the mechanical strength of the guide piece 14 located on the second side of the base B can be set higher than that of the guide piece which is formed only by one portion of the front or the rear of the base B. As a result, it is possible to enhance the mechanical strength with respect to a load given to the guide piece 14 from the wire 4.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A parking brake comprising:
    a base comprising a first side and a second side opposite the first side;
    a lever pivotally mounted to the base so as to be movable relative to the base, wherein the lever sandwiches the base therein, the lever comprising:
        a first lever member having a first lever member base portion arranged on the first side of the base, a guide piece arranged on the second side of the base, and first and second bent portions disposed on an anteroposterior position of the base and being bent toward the second side, extending across said base, and connecting to the guide piece so as to interconnect the first lever member base portion and the guide piece so as to form one-piece; and
        a second lever member arranged on the second side of the base; and
    said first lever member guide piece and said second lever member cooperating to provide a guide member disposed entirely on the second side of the base that guides a wire to generate a brake force in accordance with an operation of the lever,
    wherein an opening is defined by said first lever member, said guide piece, and said first and second bent portions, and said base is inserted in said opening.

2. The parking brake according to claim 1, wherein the first bent portion is integral with a front portion of the first lever member base portion located on the first side of the base and the second bent portion is integral with a rear portion of the first lever member base portion located on the first side of the base, and
    the front and rear are defined relative to the base.

3. The parking brake according to claim 2, wherein a part of the second lever member comprises:
    an upper guide piece perpendicularly bent away from the base; and a side guide piece perpendicularly bent downward with respect to the upper guide piece, wherein a connecting hole, in which the wire is received, is formed in the guide piece of the first lever member and the side guide piece.

4. The parking brake according to claim 1, further comprising:
   a ratchet gear on the base; and
   a pawl that is oscillatably supported on one of the first and second lever members,
   wherein the pawl engages with the ratchet gear to hold the lever in an operating state, and
   the lever member is formed to cover the ratchet gear.

5. The parking brake according to claim 1, wherein the space is an opening formed in a front-rear direction.

6. The parking brake according to claim 1, wherein the base is secured to an associated vehicle so as to be stationary with respect to the associated vehicle.

7. The parking brake according to claim 6, wherein the entirety of the lever is movable relative to the base.

8. The parking brake according to claim 6, further comprising:
   a ratchet gear on the base; and
   a pawl that is oscillatably supported on a movable portion of one of the first and second lever members,
   wherein the pawl engages with the ratchet gear to hold the lever in an operating state, and
   the lever member is formed to cover the ratchet gear.

9. The parking brake according to claim 1, wherein the guide member has an arc shape such that a length of the wire is relatively shorter at a start of pulling of the lever than at an end of pulling of the lever.

* * * * *